United States Patent
Benari et al.

(10) Patent No.: US 8,925,066 B2
(45) Date of Patent: Dec. 30, 2014

(54) PROVISIONING PROXY FOR PROVISIONING DATA ON HARDWARE RESOURCES

(71) Applicant: Red Hat Israel, Ltd., Raanana (IL)

(72) Inventors: Amos Benari, Raanana (IL); Ohad Levy, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 13/678,408

(22) Filed: Nov. 15, 2012

(65) Prior Publication Data

US 2014/0137230 A1    May 15, 2014

(51) Int. Cl.
  *G06F 21/00* (2013.01)

(52) U.S. Cl.
  USPC ................ 726/12; 726/3; 726/11; 709/219

(58) Field of Classification Search
  CPC .. H04L 63/0281; H04L 65/1069; G06F 21/00
  USPC .................... 726/3, 11–12; 709/219
  See application file for complete search history.

(56) References Cited

U.S. PATENT DOCUMENTS

| | | | |
|---|---|---|---|
| 2008/0147684 A1* | 6/2008 | Sadovsky et al. | 707/100 |
| 2009/0217362 A1* | 8/2009 | Nanda et al. | 726/5 |
| 2010/0299514 A1* | 11/2010 | Samba et al. | 713/2 |
| 2013/0091350 A1* | 4/2013 | Gluck | 713/153 |
| 2013/0269011 A1* | 10/2013 | Wilson | 726/6 |

* cited by examiner

*Primary Examiner* — Joseph Hirl
*Assistant Examiner* — Kalish Bell
(74) *Attorney, Agent, or Firm* — Lowenstein Sandler LLP (57) ABSTRACT

A processing device receives an unauthenticated provisioning request from a hardware, wherein the processing device is in a first network zone that is accessible to the hardware resource. The processing device determines whether the hardware resource satisfies one or more provisioning criteria. Responsive to determining that the hardware resource satisfies the one or more provisioning criteria, the processing device forwards the provisioning request to a server residing behind a firewall in a second network zone that is inaccessible to the hardware resource, receives provisioning data from the server by the provisioning proxy, and forwards the provisioning data to the hardware resource.

17 Claims, 6 Drawing Sheets

PROVISIONING PROXY FOR PROVISIONING DATA ON HARDWARE RESOURCES

TECHNICAL FIELD

Embodiments of the invention relate generally to resource provisioning, and more specifically to a provisioning proxy that facilitates provisioning for resources in secure and non-secure environments.

BACKGROUND

Provisioning is a set of actions to prepare a system with appropriate data and software to make it ready for operation. Typical tasks performed during provisioning include selecting software to be installed (e.g., including an operating system, device drivers, middleware and/or one or more applications), downloading the software to a resource (e.g., a hardware resource such as a computer or a virtual machine resource), installing the software, customizing and configuring the software, and setting parameters such as IP address and IP gateway enable the finding of associated network and storage resources. Typically, provisioning is performed after authenticating a resource to which software will be provisioned. However, some systems may not have credentials (e.g., a digital certificate) that may be used to perform authentication. For example, new hardware resources that have not had an operating system installed thereon (e.g., bare metal hardware) may not have credentials to perform authentication. Accordingly, provisioning systems typically do not perform authentication before provisioning operating systems to bare metal hardware. This can expose the provisioning system to attack.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention describe a provisioning proxy that facilitates the provisioning of data on hardware resources. The provisioning may be performed in an automated manner, with little or no user interaction. The provisioning proxy receives provisioning requests from both authenticated and unauthenticated hardware resources. The provisioning requests may be requests to provision operating systems on the hardware resources. Responsive to receiving a provisioning request, the provisioning proxy may determine whether the provisioning request satisfies one or more provisioning criteria. If the provisioning request satisfies the provisioning criteria, the provisioning proxy forwards the provisioning request to a provisioning server. The provisioning proxy then receives provisioning data from the provisioning server, and forwards the provisioning data to the hardware resource from which the request was received. The hardware resource may then install, for example, an operating system such as a minimal operating system based on the provisioning data.

The provisioning proxy may reside in a non-secure environment (e.g., a non-secure network zone) that is accessible to new hardware resources, and the provisioning server may reside behind a firewall in a secure environment (e.g., a secure network zone). By having the provisioning proxy make provisioning requests to the provisioning server on behalf of the hardware resources, the provisioning proxy reduces an attack surface of the provisioning server. This ensures that unauthenticated resources are not able to access the provisioning server, thus increasing security.

Figure 1:
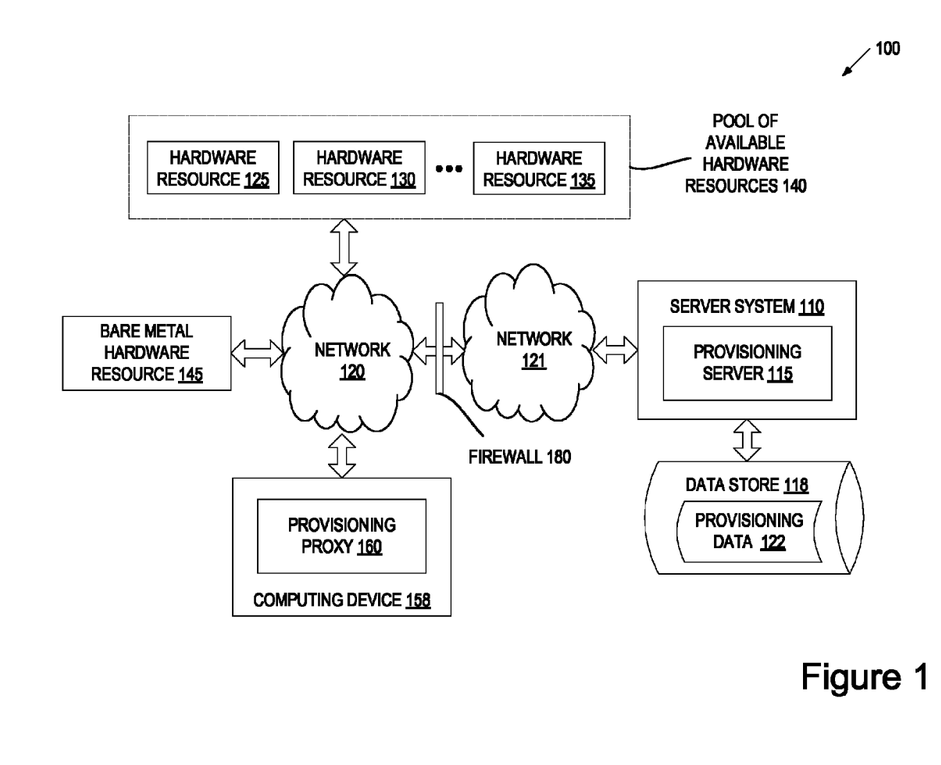
FIG. 1 is a block diagram of an example network architecture in which embodiments of the present invention may operate.

FIG. 1 illustrates an example network architecture 100 in which embodiments of the present invention may operate. The network architecture 100 includes a computing device 158 connected to a pool of available hardware resources 140 and a bare metal hardware resource 145 via a network 120. The computing device 158 is additionally connected to a server system 110 via network 120 and network 121, which may be separated by a firewall 180. The networks 120, 121 may be private networks (e.g., a local area network (LAN), wide area network (WAN), intranet, etc.), public networks (e.g., the Internet), or a combination thereof. In one implementation, network 121 is a secure enterprise network and network 120 includes a non-secure network segment of the secure enterprise network that is separated from the secure enterprise network. For example, network 120 may include a DMZ of network 121. A DMZ is a physical or logical sub-network that contains and/or exposes an enterprise's external facing services (e.g., a provisioning service) to a larger untrusted network (e.g., the Internet).

Server system 110 may be a rackmount server, a workstation, a desktop computer, a notebook computer, a tablet computer, a mobile phone, a palm-sized computing device, a personal digital assistant (PDA), etc. Server system 110 may be coupled to one or more data stores 118, which may be local data stores or network data stores such as a storage area network (SAN), network attached storage (NAS) or cloud based storage (e.g., storage as a service (SaaS)).

Server system 110 includes a provisioning server 115 that provides a provisioning service for provisioning operating systems, middleware, device drivers, applications and other data on resources. For example, provisioning server 115 may perform bare metal provisioning. Bare metal provisioning is the provisioning of an operating system and other data onto a resource that lacks an operating system. For bare metal provisioning, system firmware of the bare metal hardware resource 145 may provide input/output and console interfaces. The operating systems, middleware, device drivers, applications and other data may be software embodied in machine readable instructions that can be executed by a processing device to perform operations such as run programs. Provisioning server 115 may receive a provisioning request that originated from a bare metal hardware resource 145 or other hardware resource 125-135, and may start the provisioning process based on the received provisioning request. Data store 118 may include provisioning data 122 that is usable to provision software (e.g., an operating system, device drivers, middleware, applications, etc.) on hardware resources. The provisioning data 122 may include installation files, disk images, configuration information, etc. for various versions of operating systems, device drivers, middleware and applications. Provisioning data 122 may be downloaded to hardware resources (e.g., bare metal hardware resource 145) to cause the hardware resource to install and/or configure specific data.

The pool of available resources 140 includes multiple hardware resources 125, 130, 135 that may be used to provision applications (e.g., application components for composite applications). Hardware resources 125, 130, 135 may include computing devices having various hardware properties and components. The hardware resources 125, 130, 135 may include, for example, desktop computers, laptop computers, rackmount servers, routers, switches, tablet computers, mobile phones, or any other type of computing device. Hardware resources 125, 130, 135 may include one or more processing devices, memory, and/or additional devices such as a graphics card, hardware RAID controller, network controller, hard disk drive, universal serial bus (USB) device, internal input/output (I/O) device, keyboard, mouse, speaker, etc. Different hardware resources may have different amounts of memory, different communication capabilities, different levels of storage space, different processing power, and so forth. For example, a first hardware resource may include four network adapters, and a second hardware resource may include only a single network adapter.

Hardware resources 125, 130, 135 in the pool of available hardware resources 140 may include a minimal operating system that can report on the status, properties and components of the hardware resources. Some hardware resources 125, 130, 135 may include full operating systems on which additional software such as device drivers, middleware and applications may be installed. A common trait of the hardware resources 125, 130, 135 is that they are all capable of authenticating themselves to a provisioning proxy 160 and/or to a provisioning server 115 to perform or complete provisioning. For example, hardware resources 125, 130, 135 may each have digital certificates (e.g., public key certificates) that can be used to perform authentication.

Bare metal hardware resource 145 is a hardware resource that does not include an operating system. Bare metal hardware resource 145 may be any type of computing device, such as a desktop computer, laptop computer, rackmount server, router, switch, tablet computer, mobile phone, and so forth. The term bare metal is used because the services exposed by the bare metal hardware resource 145 are provided by firmware. Both firmware and software are sets of machine readable instructions that can be executed by a processing device to perform operations. However, firmware has instructions that reside on memory (e.g., read only memory (ROM), Flash, etc.), such as instructions for a basic input/output system (BIOS) or for an extensible firmware interface (EFI). Firmware is typically designed to run directly on hardware, whereas software is typically designed to run on an operating system.

Bare metal hardware resource 145 may be a new hardware resource that has been connected to network 120. Bare metal hardware resource 145 may be managed by an automated provisioning system. Accordingly, bare metal hardware 145 may be automatically powered on, may automatically generate provisioning requests, etc. without user input.

A bare metal resource 145 typically does not have a digital certificate or other verifiable identification, and typically is not able to authenticate itself to servers. This can pose a security risk to provisioning server 115 that provisions software to the bare metal hardware resource 145. Since provisioning server 115 contains information on multiple different systems, an individual who gains access to the provisioning server may also gain access to the multiple other systems. Accordingly, the network architecture 100 includes computing device 158, which hosts a provisioning proxy 160. Computing device 158 may be a rackmount server, a workstation, a desktop computer, a notebook computer, a tablet computer, a mobile phone, a palm-sized computing device, a personal digital assistant (PDA), etc. Provisioning proxy 160 is accessible to bare metal hardware resource 145, while provisioning server 115 is not accessible to bare metal hardware resource 145.

Firewall 180 separates network 121 from network 120, and blocks access attempts to provisioning server 115 received from hardware resources 125, 130, 135 and bare metal hardware resource 145. Accordingly, network 121 may be a secure network zone that is inaccessible to hardware resources, and network 120 may be a non-secure network zone that is accessible to hardware resources. The firewall 180 is configured to permit provisioning proxy 160 to access provisioning server 115. Thus, when bare metal hardware resource 145 (or other hardware resources 125, 130, 135) is to be provisioned, it sends a provisioning request to provisioning proxy 160 rather than to provisioning server 115.

Provisioning proxy 160 facilitates the provisioning of operating systems, device drivers, middleware, applications and other data to hardware resources. Provisioning proxy may act as an intermediary between resources and provisioning server 115. In some implementations, provisioning proxy 160 appears to resources as a provisioning server.

Provisioning proxy 160 analyzes a received provisioning request and determines whether to forward the provisioning request on to provisioning server 115. After forwarding a provisioning request to provisioning server 115, provisioning proxy receives provisioning data 122 and forwards the provisioning data to bare metal resource 145 (or another hardware resource 125-135 as appropriate). Bare metal hardware resource 145 uses the received provisioning data to install an operating system, middleware, device drivers and/or additional data. In one implementation, provisioning data includes data to provision a minimal operating system (also known as a microkernel based operating system) on the bare metal hardware resource. The minimal operating system may have limited functionality that enables the hardware resource to authenticate itself to provisioning server (or provisioning proxy) and/or to report information about itself to provisioning server. Once the operating system has been provisioned on the bare metal hardware resource 145, the bare metal hardware resource 145 may obtain a digital certificate, which it may use to authenticate itself for future provisioning.

Once bare metal hardware resource 145 (or another hardware resource 125-135) is provisioned, bare metal hardware resource 145 will no longer be a bare metal hardware resource 145, and may be added to the pool of available hardware resources 140. Provisioning server 115 may accordingly update an inventory (not shown) of available resources to indicate that a new hardware resource is available. Provisioning server 115 may later provision an additional operating system (e.g., a full operating system), middleware, device drivers, applications or other data to the hardware resource.

Figure 2:
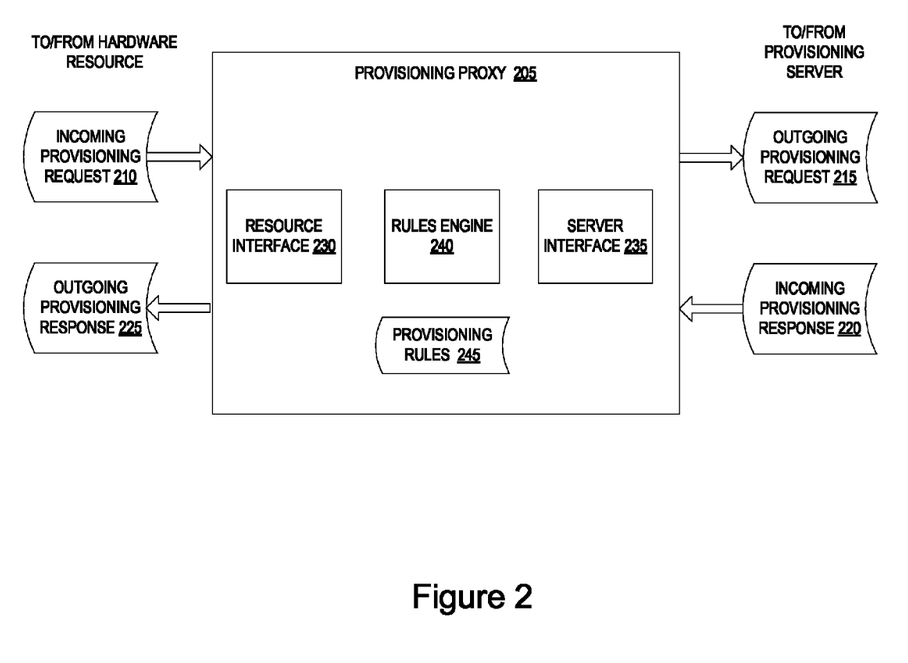
FIG. 2 is a block diagram of a provisioning proxy, in accordance with one embodiment of the present invention.

FIG. 2 is a block diagram of a provisioning proxy 205, in accordance with embodiments of the present invention. The provisioning proxy 205 may include a resource interface 230, a rules engine 240 and a server interface 235. Alternatively, the functionality of one or more of the resource interface 230, rules engine 240 and server interface 235 may be combined into a single module or separated into additional modules.

Resource interface 230 of provisioning proxy 205 may receive an incoming provisioning request 210. The provisioning request 210 may identify an operating system to be installed on a bare metal hardware resource that generated the provisioning request. Alternatively, the provisioning request may simply include information pertaining to the bare metal hardware resource. The information may include, for example, a network address of the hardware resource (e.g., an internet protocol (IP) address), information about a network card of the hardware resource (e.g., a serial number, a media access control (MAC) address, a universally unique identifier (UUID), etc.), information identifying components and/or properties of the hardware resource (e.g., processing device model and/or capabilities, a memory capacity, etc.), and so forth. In one embodiment, the provisioning request is a network boot request. Network booting is the process of booting a computing device (e.g., bare metal hardware resource 145) from a network. A provisioning server or the provisioning proxy 205 may determine an operating system to provision on the bare metal hardware resource based on the information.

In one embodiment, rules engine 240 parses the provisioning request 210. Parsing the provisioning request 210 may include analyzing the provisioning request 210 to create an internal representation of the provisioning request 210. Parsing the provisioning request 210 may include, for example, performing a lexical analysis, creating tokens based on the lexical analysis, and performing a syntactic analysis to create a parse tree.

Once the provisioning request 210 has been parsed (or without such parsing in some embodiments), rules engine 240 applies one or more provisioning rules to the provisioning request 210 to determine whether the provisioning request should be satisfied. A rule (such as a provisioning rule 245) is an abstract structure that describes a formal language precisely (e.g., a set of rules that mathematically delineates a (usually infinite) set of finite-length strings over a (usually finite) alphabet). Rules may perform actions, provide information, help process messages, etc. A rule may include conditional elements (e.g., and, or, not, exists, etc.), constraints (e.g., equal to, not equal to, greater than, contains, etc.) and consequences or actions (e.g., decrypt message, process next rule, forward message to provisioning server, black list hardware resource, etc.). In one example, provisioning rules 245 are usable to determine whether to forward provisioning requests to the provisioning server.

Rules engine 240 may be a logic component that processes provisioning rules 245 to produce outcomes. The rules engine 240 may match facts and data (e.g., as gathered from the provisioning request and/or from other sources) and rules, and infer conclusions which may result in actions or events. In one example, the rules engine 240 is a pattern matching rules engine. The rules engine 240 may match the facts, data and rules using, for example, a Rete Algorithm, a Linear Algorithm, a Treat Algorithm, a Leaps Algorithm, etc. Hybrid algorithms that use combinations of, for example, the Leaps Algorithm and the Rete Algorithm, may also be used.

The rules engine 240 may use provisioning rules 245 to determine whether to forward an incoming provisioning request 210 to a provisioning server. Such decisions may be made based on message contents (e.g., message header, message context, message body, URLs, portions of a web page being transmitted, etc.) and/or based on other information. For example, a first rule may specify that a provisioning request is received is not to be forwarded if the request was received between the hours of 6 PM and 8 AM. A second rule may specify that a provisioning request is not to be forwarded unless it is received from a particular network location (e.g., from a particular internet protocol (IP) address range). A third rule may specify that a provisioning request is to be forwarded if a requesting hardware resource has at least specified processing capabilities and memory capacity. A fourth rule may specify that provisioning is restricted to a specific number of provisioning requests per hour. Numerous other rules are also possible.

In one embodiment, provisioning rules 245 used by rules engine 240 are scripted. This can enable new rules to be added, and existing rules to be modified without requiring compiling. Alternatively, such rules 245 may be compiled.

If rules engine 240 determines that provisioning criteria specified in the provisioning rules 245 are satisfied, server interface 235 sends an outgoing provisioning request 215 to the provisioning server. The outgoing provisioning request 215 may be a simple forward of the incoming provisioning request 210. Alternatively, rules engine 240 may modify the incoming provisioning request 210 to generate the outgoing provisioning request 215. Such modifications may include changing an address in the provisioning request so that the provisioning server will provide provisioning data to the provisioning proxy 205 rather than directly to the hardware resource. Additionally, server interface 235 may encrypt the outgoing provisioning request 215 before sending it out.

Server interface 235 may receive provisioning data in an incoming provisioning response message 220. If the incoming provisioning data is encrypted, server interface 235 or rules engine may decrypt a message that contains the incoming provisioning data. Resource interface 230 may then send the provisioning data 225 to the hardware resource in an outgoing provisioning response message 225 (which may be unencrypted). As with the provisioning request, the rules engine 240 may modify the incoming provisioning response 220 to generate the outgoing provisioning response 225. Such modification may include removing any sensitive data such as an address of the provisioning server from the incoming provisioning response 220. Alternatively, the outgoing provisioning response 225 may be a simple forward of the incoming provisioning response.

In one embodiment, a network install of the operating system is automatically performed on the hardware resource. This may include causing the hardware resource to perform a network boot, which causes the hardware resource to boot up using a minimal operating system (e.g., a virtual operating system that is not an installer) provided by the provisioning server or by another server. Once the minimal operating system is running, provisioning server 115 may provide scripts for the minimal operating system to execute, data formatted in a binary format readable by the minimal operating system, and so on. For example, once the hardware resource has booted up using the minimal operating system, it may begin downloading data for another operating system, and may subsequently install the other operating system. The other operating system may correspond to an operating system identified in the software resource criteria for the node of the composite application.

Figure 3:
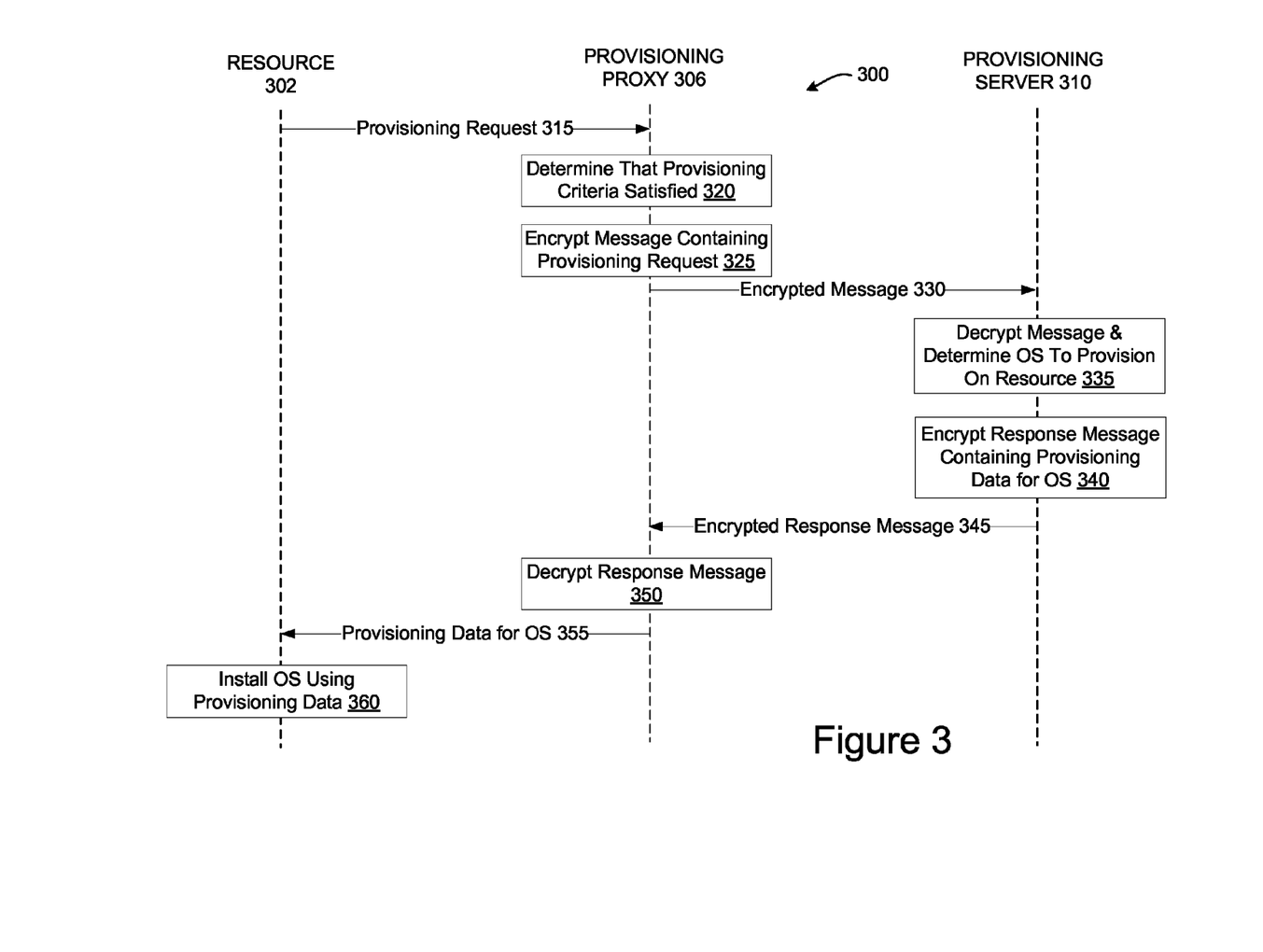
FIG. 3 is a sequence diagram showing a provisioning proxy facilitating provisioning of an operating system on a resource.

FIG. 3 is an example sequence diagram showing a provisioning proxy 306 facilitating provisioning of an operating system on a resource 302. As shown, a resource 302 (e.g., a bare metal hardware resource or another type of resource) sends a provisioning request to the provisioning proxy 306 at block 315. The provisioning request may be a network boot request or another type of provisioning request. The provisioning proxy 306 then determines whether one or more provisioning criteria are satisfied at block 320.

If the provisioning criteria are satisfied, the provisioning proxy 306 encrypts the message containing the provisioning request at block 325, and then sends the encrypted message to the provisioning server at block 330. At block 335, the provisioning server 310 decrypts the encrypted message and determines an operating system to provision on the resource. At block 340, the provisioning server generates a response message that contains provisioning data for the determined operating system. The provisioning server then encrypts the response message.

After encrypting the response message, the provisioning server 310 sends the encrypted response message to the provisioning proxy at block 345. At block 350, the provisioning proxy decrypts the response message. At block 355, the provisioning proxy sends the provisioning data to the resource 302. At block 360, the resource then installs the operating system (or begin installation of the operating system) using the provisioning data. Note that in some implementations the provisioning server 310 may send multiple encrypted messages or packets to the provisioning proxy 306 that include different portions of the provisioning data. Provisioning proxy 306 may decrypt each such message and then forward the provisioning data from that message on to the resource 302.

FIGS. 4-8 are flow diagrams showing various methods for facilitating the provisioning of an operating system (or other data) on a hardware resource. The methods may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a provisioning proxy 205 of FIG. 2.

Figure 4:
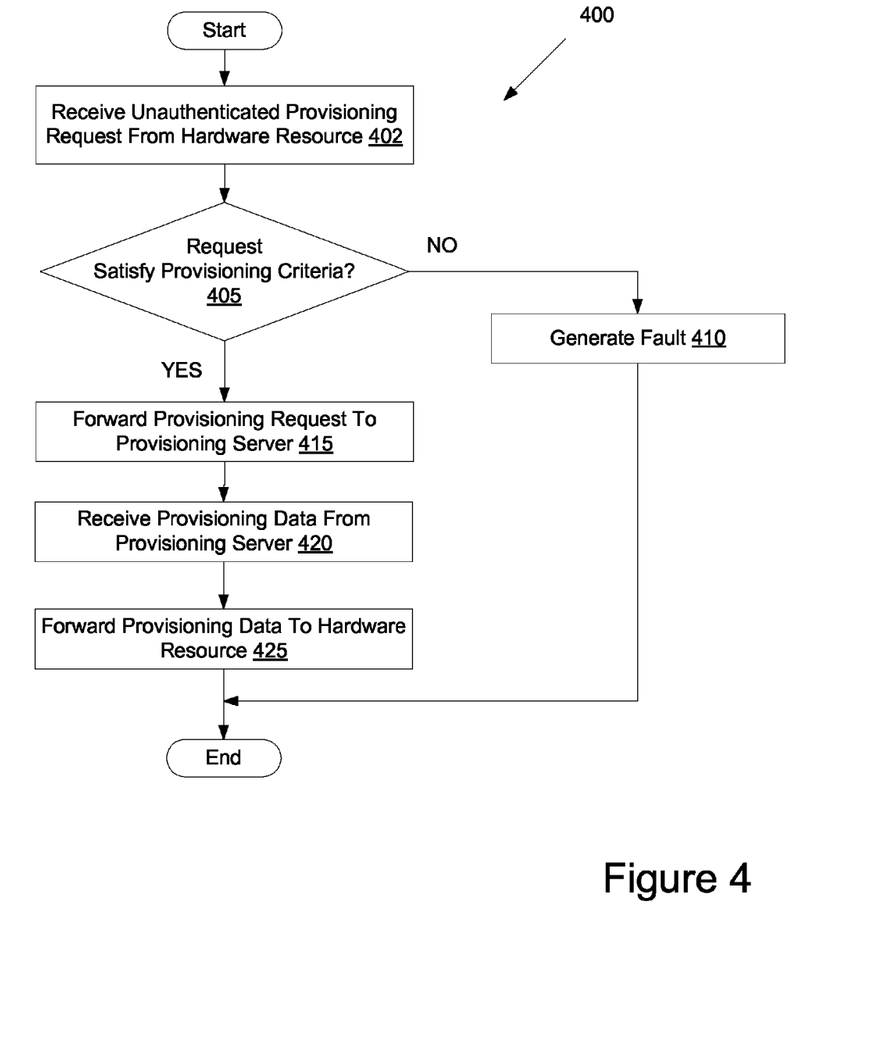
FIG. 4 is a flow diagram illustrating one embodiment of facilitating provisioning by a provisioning proxy.

FIG. 4 is a flow diagram illustrating one embodiment of a method 400 for facilitating the provisioning of an operating system on a hardware resource. At block 402 of method 400, processing logic receives an unauthenticated provisioning request from a hardware resource. The hardware resource may be a bare metal hardware resource that lacks a digital certificate.

At block 405, processing logic determines whether the request satisfies provisioning criteria. The provisioning criteria may include time based criteria, network address based criteria, resource properties based criteria, provisioning request quantity based criteria, and so on. If the provisioning request satisfies the provisioning criteria, the method continues to block 415. Otherwise, the method proceeds to block 410, and a fault is generated. Alternatively, processing logic may simply fail to take any further action with regards to the provisioning request if the provisioning criteria are not satisfied. In one embodiment, if the provisioning criteria are not satisfied processing logic records a MAC address, serial number and/or UUID included in the provisioning request. Processing logic may then add the recorded MAC address, serial number and/or UUID to a black list. Therefore, if any further provisioning requests having the same MAC address, serial number of UUID are received in the future, those provisioning requests would automatically fail a provisioning criteria that specifies that no provisioning is to be performed on hardware resources that are identified in the black list.

At block 415, processing logic forwards the provisioning request to a provisioning server. In one embodiment, processing logic modifies the provisioning request before forwarding it, such as by altering a sender address in the provisioning request or by encrypting the provisioning request. At block 420, processing logic receives provisioning data from the provisioning server. The provisioning data may be included in a provisioning response message. Processing logic may modify the provisioning response message before sending it on to the hardware resource. For example, provisioning proxy may redact any sensitive information such as a network address of the provisioning server from the provisioning response message and/or may decrypt the provisioning response message. At block 425, processing logic forwards the provisioning data to the hardware resource.

Figure 5:
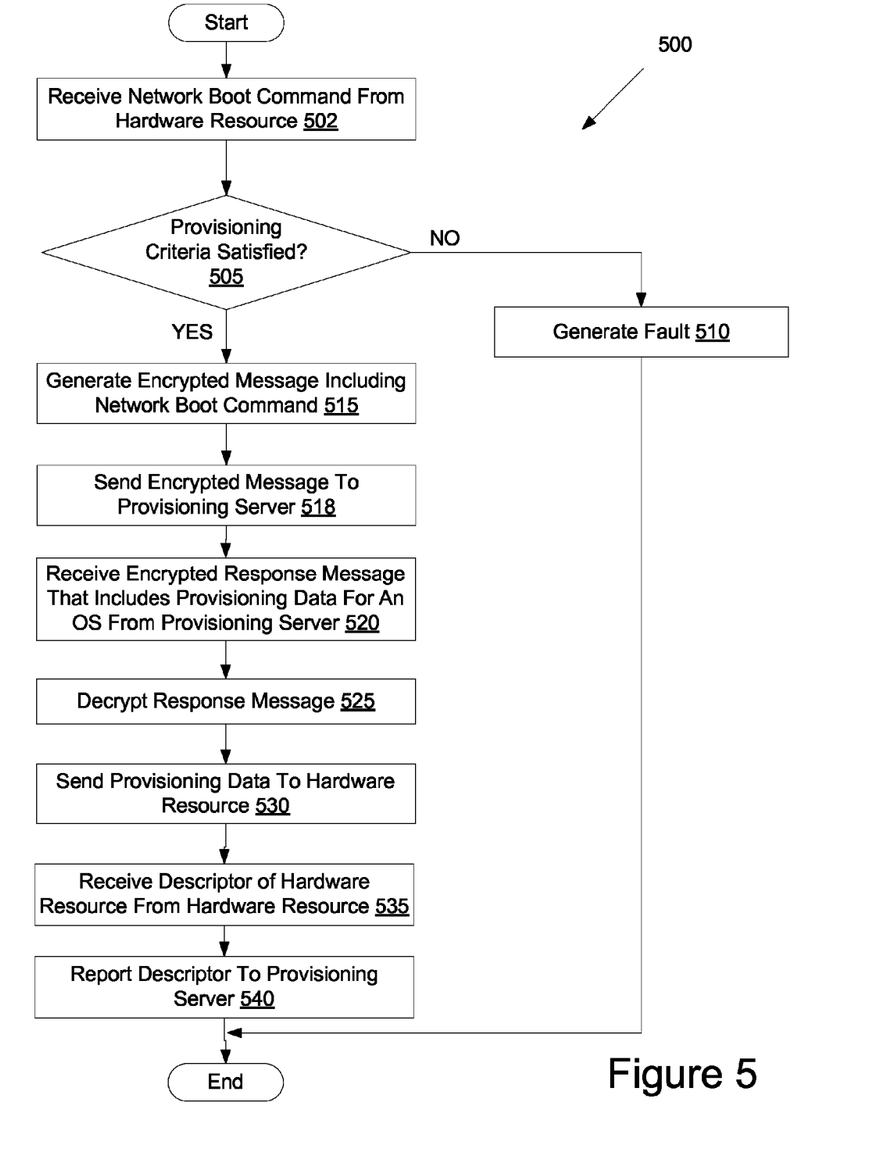
FIG. 5 is a flow diagram illustrating another embodiment of a method for facilitating provisioning by a provisioning proxy.

FIG. 5 is a flow diagram illustrating another embodiment of a method 500 for facilitating the provisioning of an operating system on a hardware resource. At block 502 of method 500 processing logic receives a network boot command from a hardware resource. At block 505, processing logic determines whether provisioning criteria are satisfied based on information contained in the network boot command. If the provisioning criteria are satisfied, the method continues to block 515. Otherwise, the method proceeds to block 510 and a fault is generated.

At block 515, processing logic generates an encrypted message that includes the network boot command. At block 518, processing logic sends the encrypted message to a provisioning server. At block 520, processing logic receives an encrypted response message that includes provisioning data for an operating system from the provisioning server.

At block 525, processing logic decrypts the response message. At block 530, processing logic sends the provisioning data to the hardware resource. After the operating system is provisioned on the hardware resource, the hardware resource may report on its status and/or capabilities. At block 535, processing logic receives a descriptor of the hardware resource from the hardware resource after the operating system has been provisioned on the hardware resource. At block 540, the processing logic reports the descriptor to the provisioning server. The provisioning server may then use the descriptor to add an entry to a resource inventory for the hardware resource. Therefore, when an application provisioning request is received, the provisioning server may review a resource inventory to identify available hardware resources having properties and components that satisfy criteria of the application.

Figure 6:
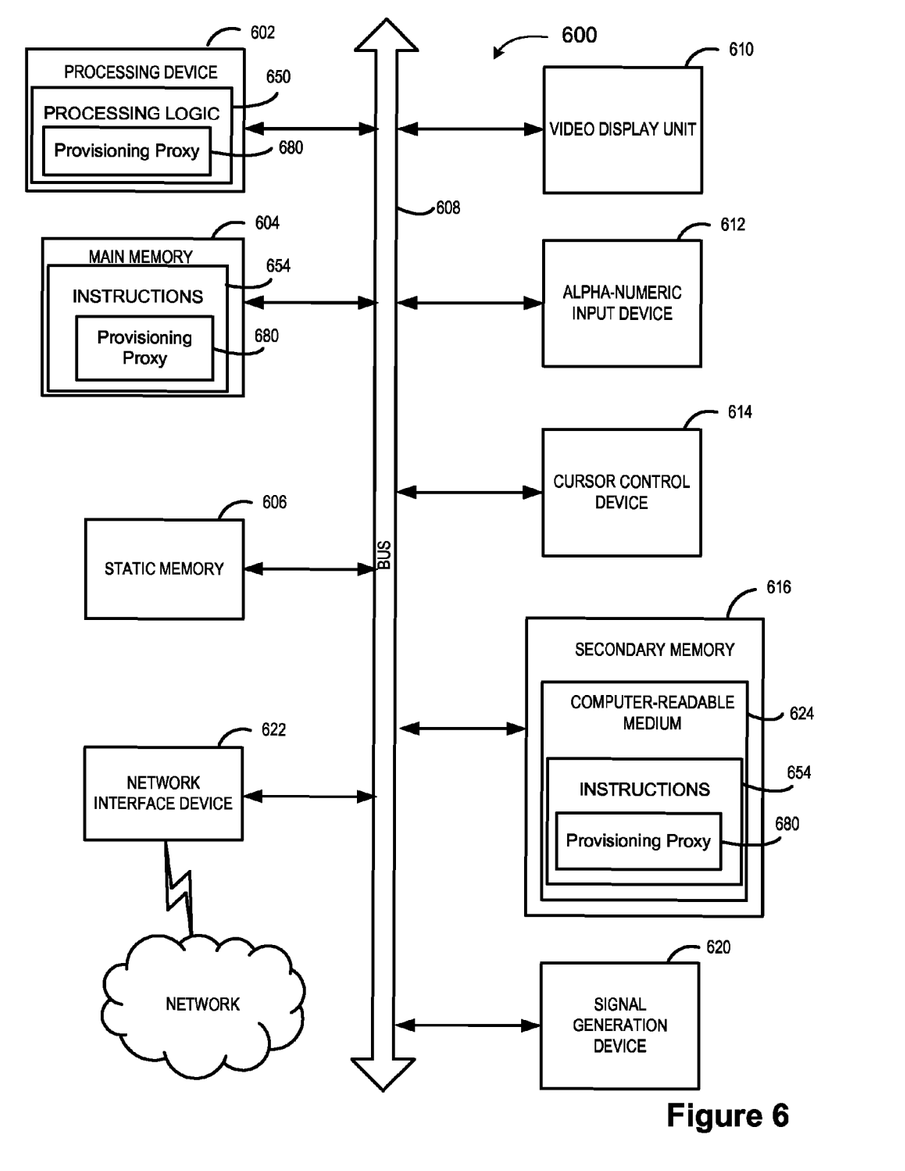
FIG. 6 illustrates a block diagram of one embodiment of a computer system.

FIG. 6 illustrates a diagrammatic representation of a machine in the example form of a computing device 600 within which a set of instructions, for causing the machine to perform any one or more of the methodologies discussed herein, may be executed. The computing device 600 may correspond, for example, to computing device 158 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computing device 600 may further include a network interface device 622. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., provisioning proxy 680, which may correspond to provisioning proxy 205 of FIG. 2). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "forwarding", "provisioning", "creating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

receiving, by a processing device running a provisioning proxy, an unauthenticated provisioning request comprising a network boot command from a hardware resource, wherein the processing device is in a first network zone that is accessible to the hardware resource;
determining, by the processing device, whether the hardware resource satisfies one or more provisioning criteria;
responsive to determining that the hardware resource satisfies the one or more provisioning criteria:
forwarding the provisioning request to a server residing behind a firewall in a second network zone that is inaccessible to the hardware resource;
receiving, by the processing device, provisioning data from the server;
removing, by the processing device, sensitive information of the server from the provisioning data, the sensitive information of the server comprising a network address of the server; and
forwarding the provisioning data to the hardware resources;
receiving a descriptor of the hardware resource that identifies properties of the hardware resource; and
reporting the descriptor to the server to enable the server to add an entry to an inventory of available hardware resources based on the descriptor.

2. The method of claim 1, wherein the hardware resource does not have a digital certificate, and wherein the provisioning request comprises an identifier of a network adapter of the hardware resource, the identifier comprising at least one of a media access control (MAC) address, a serial number or a universally unique identifier (UUID).

3. The method of claim 1, wherein the provisioning data comprises a provisioning response message comprising installation data for a microkernel based operating system, wherein the hardware resource installs the microkernel based operating system responsive to receiving the provisioning data, and wherein the descriptor is received from the microkernel based operating system.

4. The method of claim 1, further comprising:
encrypting the provisioning request prior to forwarding it to the server;
receiving the provisioning data from the server in an encrypted format; and
decrypting the provisioning data prior to sending it to the hardware resource.

5. The method of claim 1, wherein the one or more provisioning criteria comprise at least one of an internet protocol (IP) address range, a time of day, and an amount of requests per hour.

6. The method of claim 1, further comprising:
generating a fault responsive to determining that the provisioning request fails to satisfy the one or more provisioning criteria.

7. A non-transitory computer readable storage medium having instructions that, when executed by a processing device, cause the processing device to:
receive, by the processing device, an unauthenticated provisioning request from a hardware resource, wherein the processing device is in a first network zone that is accessible to the hardware resource;
determine, by the processing device, whether the hardware resource satisfies one or more provisioning criteria;
responsive to determining that the hardware resource satisfies the one or more provisioning criteria:
forward the provisioning request to a server residing behind a firewall in a second network zone that is inaccessible to the hardware resource;
receive, by the processing device, provisioning data from the server;
remove, by the processing device, sensitive information of the server from the provisioning data, the sensitive information of the server comprising a network address of the server; and
forward the provisioning data to the hardware resources;
receive a descriptor of the hardware resource that identifies properties of the hardware resource; and
report the descriptor to the server to enable the server to add an entry to an inventory of available hardware resources based on the descriptor.

8. The non-transitory computer readable storage medium of claim 7, wherein the hardware resource does not have a digital certificate, and wherein the provisioning request comprises an identifier of a network adapter of the hardware resource, the identifier comprising at least one of a media access control (MAC) address, a serial number or a universally unique identifier (UUID).

9. The non-transitory computer readable storage medium of claim 7, wherein the provisioning data comprises installation data for a microkernel based operating system, wherein the hardware resource installs the microkernel based operating system responsive to receiving the provisioning data, and wherein the descriptor is received from the microkernel based operating system.

10. The non-transitory computer readable storage medium of claim 7, the processing device further to:
encrypt the provisioning request prior to forwarding it to the server;
receive the provisioning data from the server in an encrypted format; and
decrypt the provisioning data prior to sending it to the hardware resource.

11. The non-transitory computer readable storage medium of claim 7, wherein the one or more provisioning criteria comprise at least one of an internet protocol (IP) address range, a time of day, or an amount of requests per hour.

12. The non-transitory computer readable storage medium of claim 7, wherein the unauthenticated provisioning request comprises a network boot command.

13. A computing device comprising:
a memory; and
a processing device, coupled to the memory, to:
receive an unauthenticated provisioning request from a hardware resource, wherein the processing device is in a first network zone that is accessible to the hardware resource;
determine whether the hardware resource satisfies one or more provisioning criteria;
responsive to determining that the hardware resource satisfies the one or more provisioning criteria:
forward the provisioning request to a server residing behind a firewall in a second network zone that is inaccessible to the hardware resource;
receive provisioning data from the server;
remove sensitive information of the server from the provisioning data, the sensitive information of the server comprising a network address of the server; and
forward the provisioning data to the hardware resources;
receive a descriptor of the hardware resource that identifies properties of the hardware resource; and
report the descriptor to the server to enable the server to add an entry to an inventory of available hardware resources based on the descriptor.

14. The computing device of claim 13, wherein the hardware resource does not have a digital certificate, and wherein the provisioning request comprises an identifier of a network adapter of the hardware resource, the identifier comprising at least one of a media access control (MAC) address, a serial number or a universally unique identifier (UUID).

15. The computing device of claim 13, wherein the unauthenticated provisioning request comprises a network boot command and the provisioning data comprises installation data for a microkernel based operating system, wherein the hardware resource installs the microkernel based operating system responsive to receiving the provisioning data, and wherein the descriptor is received from the microkernel based operating system.

16. The computing device of claim 13, the processing device further to:
  encrypt the provisioning request prior to forwarding it to the server;
  receive the provisioning data from the server in an encrypted format; and
  decrypt the provisioning data prior to sending it to the hardware resource.

17. The computing device of claim 13, wherein the one or more provisioning criteria comprise at least one of an internet protocol (IP) address range, a time of day, or an amount of requests per hour.

* * * * *